US008571727B1

(12) United States Patent
Patera

(10) Patent No.: US 8,571,727 B1
(45) Date of Patent: Oct. 29, 2013

(54) ENERGY-ANGULAR MOMENTUM CLOSED-LOOP GUIDANCE FOR LAUNCH VEHICLES

(71) Applicant: The Aerospace Corporation, El Segundo, CA (US)

(72) Inventor: Russell Paul Patera, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 13/760,189

(22) Filed: Feb. 6, 2013

(51) Int. Cl.
*B64G 1/24* (2006.01)

(52) U.S. Cl.
USPC .............................................. 701/3; 244/164

(58) Field of Classification Search
USPC ............. 701/3, 4, 13; 244/158.1, 158.4, 164, 244/3.1, 3.21, 3.23, 159.6, 171.1, 171.3
See application file for complete search history.

(56) References Cited

U.S. PATENT DOCUMENTS 3,305,671 A 2/1967 Manoni, Jr.
3,350,548 A 10/1967 Whitaker
3,940,096 A * 2/1976 Keigler et al. ................ 244/165
4,275,861 A * 6/1981 Hubert .......................... 244/165
5,042,752 A 8/1991 Surauer et al.

OTHER PUBLICATIONS

Russell P. Patera, "Energy-Angular Momentum Plane Guidance Algorithm," Published by American Astronautical Society (2003).
Office Action issued in U.S. Appl. No. 13/746,307 on Jul. 18, 2013.

* cited by examiner

*Primary Examiner* — Dalena Tran
(74) *Attorney, Agent, or Firm* — Leonardpatel PC

(57) ABSTRACT

An improved method for launch vehicle guidance is disclosed. A pre-computed energy-angular momentum (E-J) curve to place a launch vehicle into a target orbit is received and stored. An energy, angular momentum, radial distance, velocity magnitude, and flight path angle of the launch vehicle are computed from state vector data while the launch vehicle is traveling to the target orbit. The pre-computed E-J curve and the computed energy, angular momentum, radial distance, velocity magnitude, and flight path angle of the launch vehicle are used to determine pitch and pitch rate of the launch vehicle.

30 Claims, 12 Drawing Sheets

100
Energy (km/sec)^2
0
-5
-10
-15
-20
-25
-30
-35
40000
60000
80000
100000
120000
140000
160000
Angular Momentum (km^2/sec)
RELATED ART 600
Inclination, deg.
32
31.5
31
30.5
30
29.5
29
28.5
28
Time, sec
0
100
200
300
400
500
600

700
Energy Difference, (ft/sec)^2
2.0E+03
0.0E+00
-2.0E+03
-4.0E+03
-6.0E+03
-8.0E+03
-1.0E+04
-1.2E+04
-1.4E+04
-1.6E+04
Time, sec
0
100
200
300
400
500
600

800
Energy Difference, (ft/sec)^2
4.0E+04
3.5E+04
3.0E+04
2.5E+04
2.0E+04
1.5E+04
1.0E+04
5.0E+03
0.0E+00
-5.0E+03
0
100
200
300
400
500
600
Time, sec 900
Energy Difference, (ft/sec)^2
7.0E+04
6.0E+04
5.0E+04
4.0E+04
3.0E+04
2.0E+04
1.0E+04
0.0E+00
-1.0E+04
0
100
200
300
400
500
600
Time, sec 1200
Processor 1210
Communication Device 1220
Bus 1205
1250
Other Functional Modules
1245
Guidance Module
1240
Operating System
Memory 1215
Display 1225
Keyboard 1230
Cursor Control Device 1235

ENERGY-ANGULAR MOMENTUM CLOSED-LOOP GUIDANCE FOR LAUNCH VEHICLES

FIELD

The present invention generally pertains to guidance, and more specifically, to closed-loop guidance for launch vehicles (hereinafter "vehicle") using energy-angular momentum.

BACKGROUND

Conventionally, in order to place vehicles such as satellites into a particular orbit, the direction of the vehicle's thrust vector should be determined so that the vehicle moves from its present state to a desired orbital state. The process is complicated by atmospheric drag, as well as time varying mass and thrust of the launch vehicle. Typically, an open-loop trajectory optimization simulation is used to design a mission trajectory that delivers the payload to the target orbit. Without vehicle or environmental dispersions, the time dependent attitude profile could be used in the vehicle's flight computer to guide the launch vehicle to orbit. Since dispersions tend to drive the vehicle off of its preplanned trajectory, a closed-loop guidance algorithm should be used to keep the vehicle close to the preplanned trajectory.

A closed-loop guidance algorithm may enable a vehicle to reach the target orbit even when dispersions are present. A guidance algorithm calculates a vehicle attitude and attitude rate such that the vehicle will reach the correct position at the correct time with the correct velocity. Since dispersions cause variations in the time to attain the target orbit, the targeted position and velocity should be adjusted so that the desired orbit is reached at the appropriate time. The guidance problem is somewhat complicated and involves propagating both the vehicle state and target orbit state to the orbit injection point and time. The computations can involve orbit state prediction, numerical integration, iterations, matrix inversion, root finding calculations, etc. Some examples of closed-loop guidance algorithms are Delta Guidance, Q-Guidance, Cross Product Steering, Iterative Guidance Mode ("IGM") used on Saturn launch vehicles, and Powered Explicit Guidance ("PEG") used on the Space Shuttle. As flight computers become more capable, the guidance algorithm can become more computationally expensive.

Furthermore, conventional guidance systems generally target the orbit insertion point. However, this complicates guidance since the systems are calculating an optimized trajectory while traveling. Accordingly, a more simplified approach that reduces complexity and increases accuracy may be beneficial.

SUMMARY

Certain embodiments of the present invention may be implemented and provide solutions to the problems and needs in the art that have not yet been fully solved by conventional guidance systems. For example, certain embodiments of the present invention guide a vehicle along a desired ascent trajectory and steer out vehicle and environmental related trajectory dispersions. Such embodiments can be used on the vehicle, as well as in a high fidelity 6-degree-of-freedom ("6-DOF") trajectory simulation. Some embodiments use a vehicle's trajectory in the instantaneous energy-angular momentum ("E-J") plane where total energy (gravitational plus kinetic energy) per unit mass is plotted as a function of orbital angular momentum per unit mass.

In one embodiment of the present invention, a computer program is embodied on a computer-readable storage medium. The computer program is configured to cause at least one processor to receive and store a pre-computed energy-angular momentum (E-J) curve to place a vehicle into a target orbit. The computer program is also configured to cause the at least one processor to compute an energy, angular momentum, and flight path angle of the vehicle from state vector data while the vehicle is traveling to the target orbit. The computer program is further configured to cause the at least one processor to use the pre-computed E-J curve and the computed energy, angular momentum, radial distance, velocity magnitude, and flight path angle of the vehicle to determine pitch and pitch rate of the vehicle.

In another embodiment of the present invention, a computer-implemented method includes receiving and storing a pre-computed energy-angular momentum (E-J) curve to place a vehicle into a target orbit. The computer-implemented method also includes computing an energy, angular momentum, and flight path angle of the vehicle from state vector data while the vehicle is traveling to the target orbit. The computer-implemented method further includes using the pre-computed E-J curve and the computed energy, angular momentum, radial distance, velocity magnitude, and flight path angle of the vehicle to determine pitch and pitch rate of the vehicle.

In yet another embodiment of the present invention, an apparatus includes physical memory including computer program instructions and at least one processor configured to execute the computer program instructions. The at least one processor is configured to receive and store a pre-computed energy-angular momentum (E-J) curve to place a vehicle into a target orbit. The at least one processor is also configured to compute an energy, angular momentum, radial distance, velocity magnitude, and flight path angle of the vehicle from state vector data while the vehicle is traveling to the target orbit. The at least one processor is further configured to use the pre-computed E-J curve and the computed energy, angular momentum, radial distance, velocity magnitude, and flight path angle of the vehicle to determine pitch and pitch rate of the vehicle.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
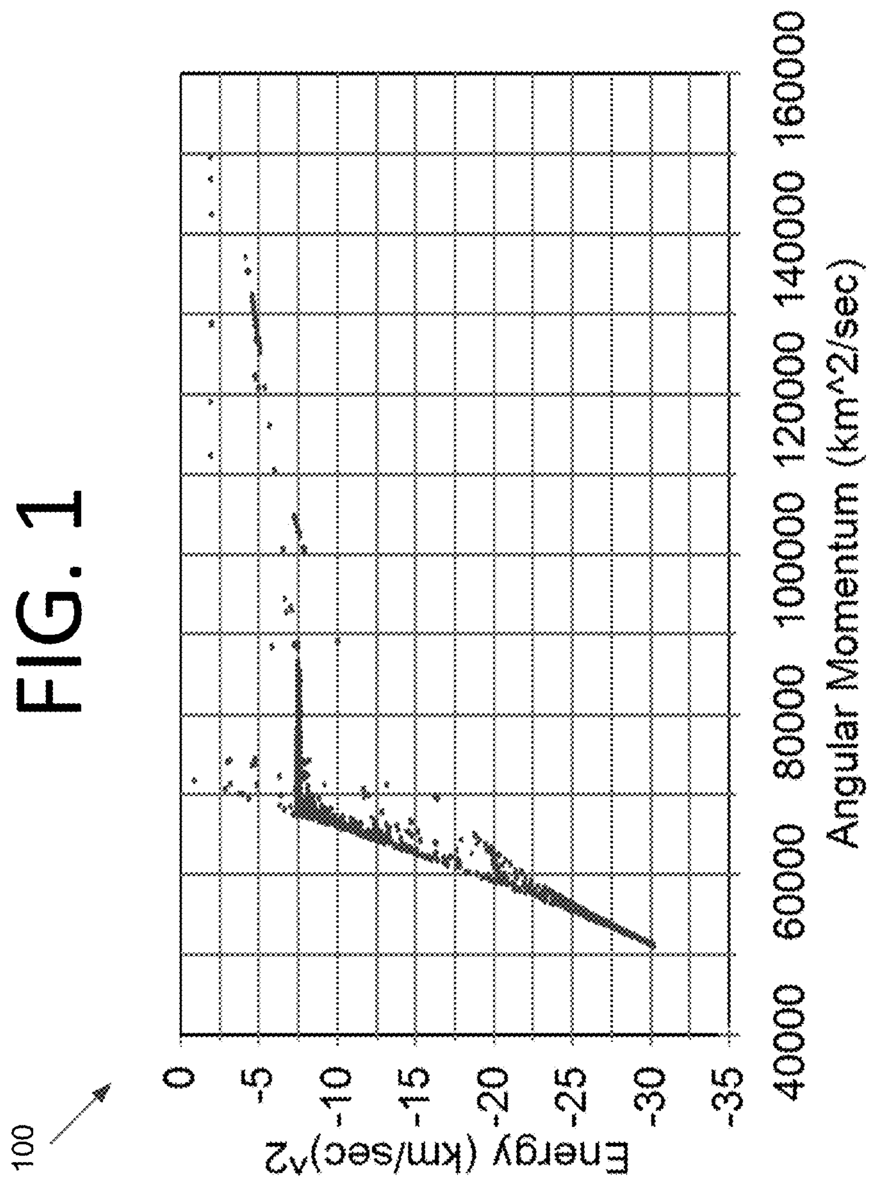
FIG. 1 is a graph illustrating E-J points of some tracked objects.

Some embodiments of the present invention pertain to a method to guide a vehicle along a desired ascent trajectory and steer out vehicle and environmental related trajectory dispersions. Such embodiments make use of angular momentum to guide the vehicle. A reason that algorithms used by embodiments of the present invention may work so well is that angular momentum magnitude is used as an independent variable instead of time, velocity, angular velocity, position, etc. These other parameters are not truly independent variables.

A single point on an instantaneous energy-angular momentum plane (E-J plane) represents an orbit having both an apogee and perigee. Thus, these points are not merely a velocity, as is the case in conventional approaches. Most conventional algorithms target final orbit insertion, but this increases complexity since such approaches are doing trajectory optimization during ascent to orbit injection. For some embodiments of the present invention, a predefined curve is followed. As such, there may be continuous guidance rather than end-point guidance.

Some embodiments could be used by vehicle companies to streamline their efforts in the area of guidance. An optimized open-loop trajectory can be used to create a file of energy, inclination, and angular momentum. This file can be used in the high fidelity closed-loop simulation to guide the vehicle to orbit. This can reduce the effort needed to develop the guidance component in the high fidelity closed-loop simulation. The file can also be used in the vehicle's flight computer to reduce the number of mission constants and guidance algorithm complexity. These considerations imply that a significant cost reduction can be achieved since the 3-DOF simulation output in the form of E-J and I-J files may be used in the vehicle flight computer and high fidelity 6-DOF simulation.

Launch vehicle companies may be interested in the guidance method of some embodiments due to the inherent simplicity, multiple uses, and the likely improvement in robustness against large dispersions. The method of some embodiments can also be applied to sub-orbital or ballistic missile trajectories since the E-J and I-J curves are also valid for those cases. Therefore, companies involved in sub-orbital vehicles may also be interested in the guidance method of some embodiments. Thus, embodiments may be beneficial for vehicles, missiles, orbit transfer of satellites, reentry vehicles, and spacecraft, etc.

Some embodiments of the present invention may be simpler and reduce cost. Conventional guidance algorithms are more complex and take more man hours, which inherently increases cost. The actual mass of the vehicle does not come into play with some embodiments. Also, it may not be necessary to know when the engines are burning. These benefits also help to make some embodiments simpler since these factors are all implicit.

Further, embodiments of the present invention allow the vehicles to fly better, thereby allowing the results to be improved. Such embodiments also may reduce the chance that the rocket may deviate from its intended course and fly over sensitive areas (i.e., cross "limit lines"). Such an event could violate airspace and force destruction of the rocket.

At each instant of time, the vehicle's state can be represented as a single point in the E-J plane. The desired optimized vehicle trajectory in the E-J plane generally begins at the launch point and ends at the orbit injection point. Although an infinite number of curves can be used to connect the initial and final points, the optimized trajectory is represented by a unique curve in the E-J plane. During flight, the actual trajectory of the vehicle in the E-J plane should be close to the optimized pre-flight trajectory in the E-J plane in order for the vehicle to achieve the desired orbit. The slope of the E-J curve, together with the flight path angle, radial distance, and velocity magnitude determines the required pitch attitude of the vehicle. Therefore, the E-J curve can be used to steer a vehicle along its optimized ascent trajectory without numerical integration, vehicle state propagation, or iterations.

Disturbances and dispersions can move the vehicle off the prescribed E-J curve. Some embodiments include an algorithm that can be used to steer the vehicle back on course in the E-J plane. In a similar manner, the pre-computed inclination-angular momentum ("I-J") curve may be used to steer the vehicle back to the I-J curve if dispersions drive the vehicle off the I-J curve. Once back on course in the E-J curve and the I-J curve, the vehicle is back on its prescribed optimized trajectory and will reach its intended orbit, given sufficient performance reserve (e.g., fuel to power the motor(s)).

This guidance algorithm can also be used in the high fidelity pre-flight simulation that is used for testing. If the vehicle has below nominal thrust, the E-J and I-J curves are still valid and do not need to be adjusted. The vehicle will simply arrive at the final point on the E-J curve at a later time. An advantage of this method is its simplicity and its use of angular momentum rather that time, velocity, or altitude as the independent variable. In addition, jettison and stage events do not need to be addressed independently, since any effect that such events may have is already incorporated into the E-J and I-J curves implicitly.

The problem of orbit transfer is parameterized in the instantaneous E-J plane. Assuming a spherical gravitational field for simplicity, an orbit of given apogee and perigee has a unique energy and angular momentum given by $$E = \frac{-GM}{r_a + r_p} \tag{1}$$

$$J = \sqrt{\frac{2GMr_ar_p}{(r_a + r_p)}} \tag{2}$$

where E is the energy per unit mass, J is the angular momentum magnitude per unit mass, G is the universal gravitational constant, M is the mass of the Earth, $r_a$ is the apogee and $r_p$ is the perigee.

Thus, an arbitrary orbit can be specified as a single point in the E-J plane. Each tracked object orbiting the Earth can be represented as a point in the E-J plane as illustrated in graph 100 of FIG. 1. For circular orbits, energy is a simple function of angular momentum given by $$E = -\frac{(GM)^2}{2J^2} \tag{3}$$

Therefore, each circular orbit is a point on the curve given by equation (3). For a given angular momentum, the energy given by equation (3) represents the minimum possible energy. Orbits having energy greater than the minimum are elliptical orbits.

Figure 2:
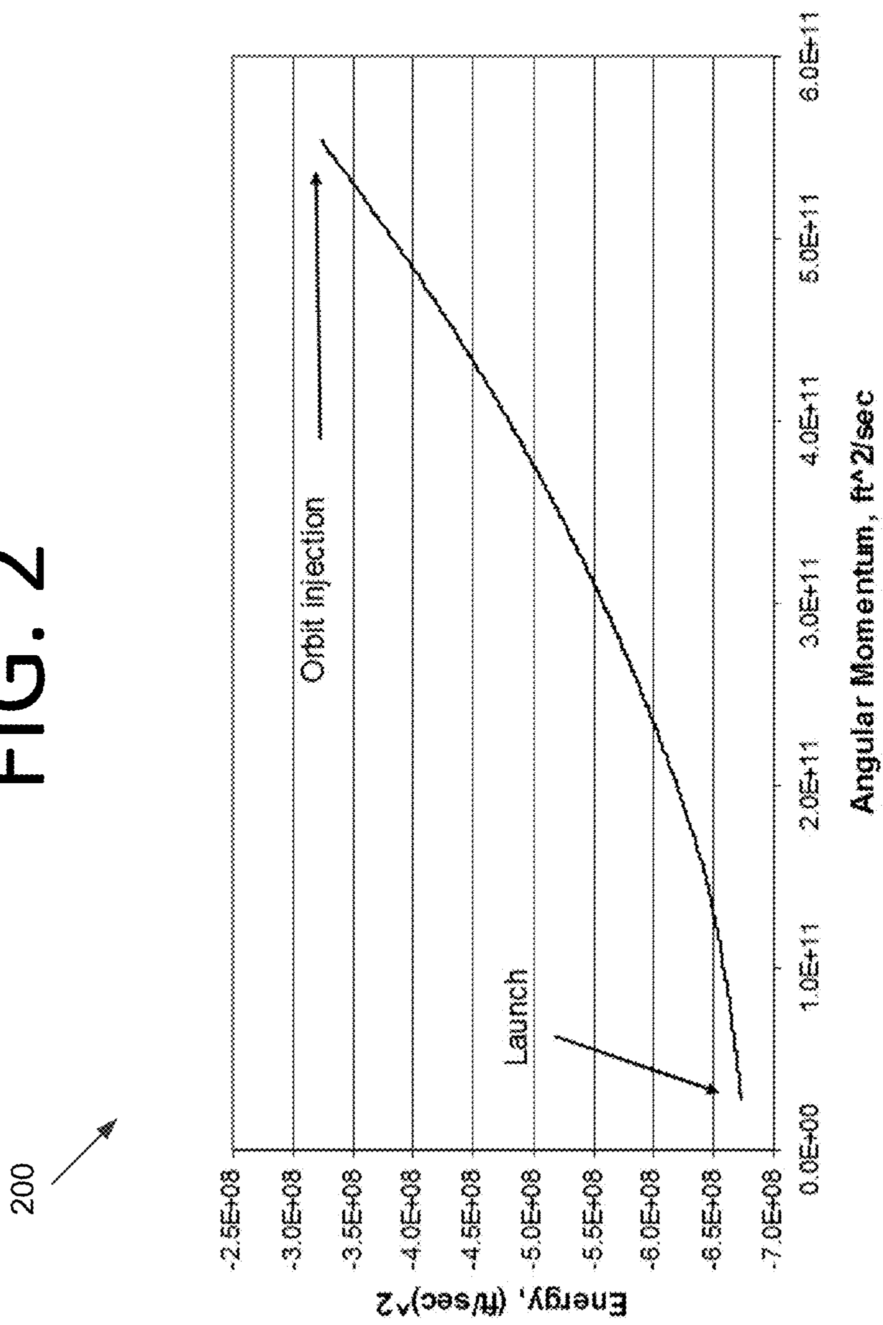
FIG. 2 is a graph illustrating total energy as a function of angular momentum magnitude, according to an embodiment of the present invention.

During an orbit transfer, the orbital state in the E-J plane moves from the initial point to the final point. This movement is described by a curve in the E-J plane, as illustrated in graph 200 of FIG. 2. There are an infinite number of such curves that connect initial and final points. The objective is to find the curve that provides a fuel-optimal transition between the two states. This objective may be achieved by a trajectory optimization simulation, the details of which are not discussed here.

Once the optimized trajectory is found, the simulation may create a file of energy and associated angular momentum throughout vehicle ascent. At each time value, the orbital angular momentum per unit mass is obtained by $$\vec{J} = \vec{R} \times \vec{V}$$

$$j(1) = R(2)*V(3) - R(3)*V(2)$$

$$j(2) = R(3)*V(1) - R(1)*V(3)$$

$$j(3) = R(1)*V(2) - R(2)*V(1) \tag{4}$$

where j(1), j(2), and j(3), are the X, Y, and Z axis components of orbital angular momentum in the Earth Centered Inertial ("ECI") reference frame. It should be appreciated that j(3), the Z-axis component of angular momentum J, points along the Earth's North Polar Axis. The j(1) and j(2) (i.e., the X-axis and Y-axis) components of angular momentum J are in the Earth's equatorial plane. It should be appreciated that the angular momentum vector is orthogonal to the E-J plane and both the angular momentum vector and the E-J plane can change orientation with respect to the ECI frame during the vehicle's ascent to orbit.

The magnitude of the orbital angular momentum is given by $$J = \sqrt{j(1)^2 + j(2)^2 + j(3)^2} \tag{5}$$

The magnitudes of R(t) and V(t) are r and v, respectively, and are given by $$r = \sqrt{R(1)^2 + R(2)^2 + R(3)^2} \tag{6}$$

$$v = \sqrt{V(1)^2 + V(2)^2 + V(3)^2} \tag{7}$$

respectively. The total energy per unit mass, which includes both gravitational potential energy and kinetic energy, is given by $$E = 0.5(v)^2 - \left(\frac{GM\left(1 + \sum\right)}{r}\right) \tag{8}$$

where G is the Universal Gravitational Constant, Σ is the sum of higher order gravitational terms, and M is the mass of the Earth. Typically, only one term is included in Σ due to oblateness. This additional term is given by $$\sum = -\left(\frac{J_2}{2}\right)\left(\frac{r_E}{r}\right)^2\left[3\left(\sin^2\left(\frac{R(3)}{r}\right)\right) - 1\right] \tag{9}$$

where $J_2$ is the Earth oblateness constant and $r_E$ is the Earth's equatorial radius.

This E-J file may be used in the high fidelity vehicle simulation to guide the vehicle to orbit.

Figure 3:
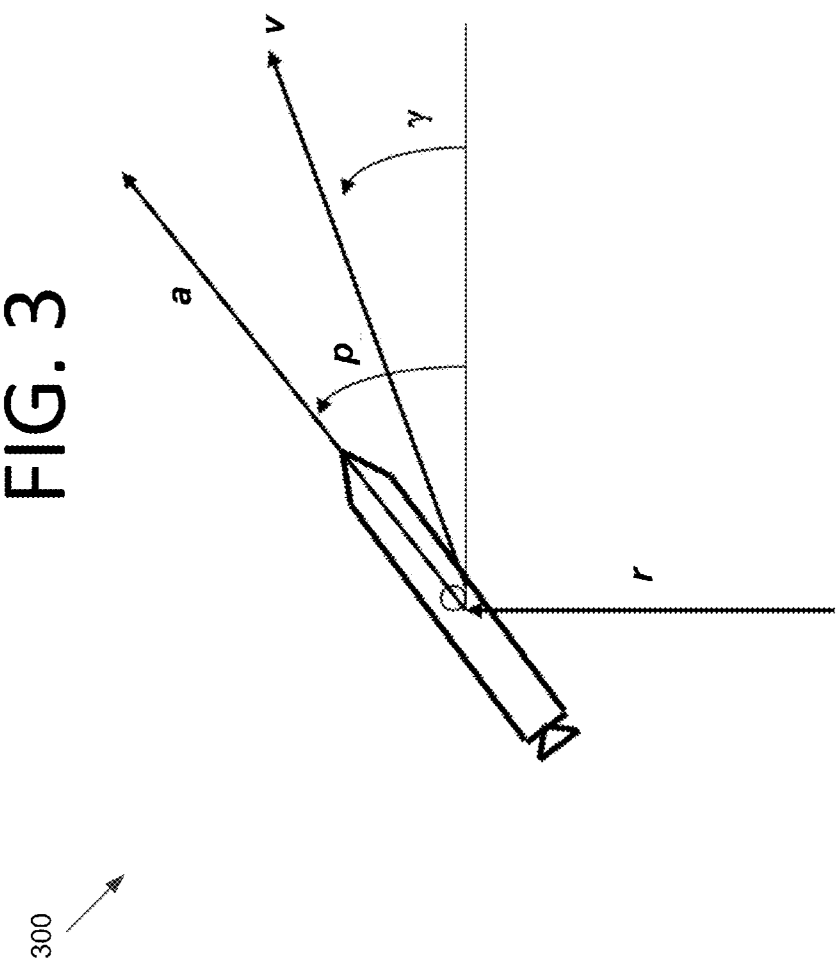
FIG. 3 illustrates pitch and flight path angle definitions.

The rate of change of angular momentum magnitude for an accelerating vehicle is given by $$\frac{dJ}{dt} = ra\cos(p) \tag{10}$$

where r is the distance to the center of the earth or gravitational field, a is the acceleration, and p is the pitch angle defined in pitch and flight path angle definitions 300 of FIG. 3. The rate of change of energy for the accelerating vehicle is given by $$\frac{dE}{dt} = va\cos(p - \gamma) \tag{11}$$

where v is the velocity magnitude and γ is the flight path angle illustrated in FIG. 3 and given by $$\gamma = \sin^{-1}\left(\frac{R(1)V(1) + R(2)V(2) + R(3)V(3)}{rv}\right) \tag{12}$$

The derivative of energy with respect to angular momentum is independent of acceleration and is given by $$\frac{dE}{dJ} = \frac{v\cos(p - \gamma)}{r\cos(p)} \tag{13}$$

Equation (13) can be expressed as $$\frac{dE}{dJ} = \left(\frac{v}{r}\right)(\cos(\gamma) + \tan(p)\sin(\gamma)) \tag{14}$$

Equation (14) can be rearranged to determine tan (p)

$$\tan(p) = \frac{\left(\frac{r}{v}\right)\left(\frac{dE}{dJ}\right) - \cos(\gamma)}{\sin(\gamma)} \tag{15}$$

p is given by $$p = \tan^{-1}\left(\frac{\left(\frac{r}{v}\right)\left(\frac{dE}{dJ}\right) - \cos(\gamma)}{\sin(\gamma)}\right) \tag{16}$$

The pitch rate is found by taking the derivative of equation (15) and simplifying $$\frac{dp}{dt} = \frac{\left(\frac{dE}{dJ}\right)\left(\frac{dr}{dt}\right)\cos^2(p)}{v\sin(\gamma)} - \frac{r\cos^2(p)\left(\frac{dE}{dJ}\right)\left(\frac{dv}{dt}\right)}{v^2\sin(\gamma)} + \frac{ar^2\left(\frac{d^2E}{dJ^2}\right)\cos^3(p)}{v\sin(\gamma)} \tag{17}$$

The rate of change of r and v in equation (17) is obtained in real time by the flight computer. The second derivative of energy with respect to angular momentum is obtained from the E-J curve via numerical processing. For gamma equal to zero, the pitch angle is not determined because from equation (13), dE/dJ=v/r for all pitch angles. Thus, for circular orbits, gamma is zero and dE/dJ=v/r.

The form of equation (16) can be modified to permit easier selection of the pitch angle for vehicles. One can require that the pitch angle be restricted to ±90 degrees.

$$\sin(p) = \frac{\left(r\frac{dE}{dJ} - v\cos(\gamma)\right)}{\sqrt{v^2 + \left(r\frac{dE}{dJ}\right)^2 - 2rv\cos(\gamma)\frac{dE}{dJ}}} \tag{18}$$

As the vehicle nears the orbit injection point, the flight computer may predict the time-to-go ("tgo") so that the engine can be shut down properly. The time it takes to shut the engine down and the engine tailoff impulse can impart a significant delta velocity to the vehicle. With an accurate prediction of tgo, the engine shutdown can be timed to account for the delta velocity and minimize orbit injection error. Time-to-go can be calculated as $$tgo = \frac{J_f - J}{(a)(r)\cos(p)} \tag{19}$$

where $J_f$ is the angular momentum magnitude at orbit injection. Equation (19) is valid near the injection point where the acceleration a, radial distance r, and pitch angle p are nearly constant.

The instantaneous inclination angle of the vehicle is given by $$I_V = \cos^{-1}\left(\frac{J(3)}{J}\right) \tag{20}$$

In most cases, yaw steering is accomplished by selecting the proper launch azimuth to achieve the final inclination. Little additional steering is done since significant yaw maneuvering reduces vehicle performance. However, dogleg maneuvers are done in some cases to avoid over-flight of sensitive geographic regions.

The E-J curve may be stored in the vehicle's flight computer for use during ascent to orbit injection. The vehicle ascent through the atmosphere follows the usual sequence of vertical ascent, pitch-over, and gravity turn. Usually, the closed loop algorithm is invoked once the aerodynamic forces are low enough to permit a non-zero angle of attack. Two options exist for the mechanization of this new guidance algorithm. The guidance algorithm can be invoked at any time from liftoff through atmospheric ascent and attitude adjustments can be made based on aerodynamic loading constraints. Alternatively, the guidance algorithm can be invoked once the aerodynamic loads are low enough to permit a non-zero angle of attack.

Since the state of the vehicle in terms of energy and angular momentum is known at initiation of the guidance algorithm, the initial point in the E-J plane is also known. The pitch and pitch rate are found using equations (18) and (17), respectively, and the pitch and pitch rate are used to guide the vehicle to the target orbit. Under ideal circumstances with no disturbances and nominal vehicle performance, the vehicle will reach its intended orbit using pitch and pitch rate from equations (18) and (17), respectively.

However, environmental disturbances during atmospheric flight, as well as vehicle dispersions throughout the entire ascent, will cause the vehicle energy to be different than that of the E-J curve for a given value of vehicle angular momentum. Therefore, the guidance algorithm should also be able to correct for the dispersions and return the vehicle to its prescribed trajectory along the E-J curve. This can be achieved by adding a correction to the slope of the E-J curve so that the dispersions will be steered out as the vehicle follows the trajectory and its angular momentum increases. A disturbance is defined by the difference in the actual vehicle energy and the energy prescribed by the E-J curve.

$$\Delta E = E_C - E_V \tag{21}$$

where $E_V$ and $E_C$ are the vehicle specific energy and specific energy from the E-J curve, respectively. In order to remove this dispersion, the vehicle should fly with a corrected slope of its E-J curve to drive the ΔE disturbance to zero. This may be achieved by a correction to the slope given by $$\delta(J) = \frac{(B)\Delta E}{(1+\varepsilon)J_f - J} \tag{22}$$

where B is a constant gain or can be a function of J whose value can be adjusted as needed to ensure satisfactory performance. The subscript f refers to the final angular momentum at orbit injection. The constant $\epsilon$ is a small positive non-dimensional number that ensures that the denominator of equation (22) does not become zero.

The corrected slope, which is indicated by subscript C, is used in equations (17) and (18) and is given by $$\left(\frac{dE}{dJ}\right)_C = \left(\frac{dE}{dJ}\right) + \delta(J) \tag{23}$$

Vehicle and environmental dispersions can also drive the vehicle off of its prescribed I-J curve. Fortunately, yaw corrections can steer the vehicle back to the I-J curve. The vehicle's inclination and angular momentum are computed from data obtained from the inertial navigation unit ("INU"). The needed correction to inclination is given by $$\Delta I = I_C - I_v \tag{24}$$

where the subscripts C and V refer to the predicted I-J curve and the actual vehicle I-J curve, respectively.

The yaw adjustment is given by $$\delta\theta = \frac{-\Delta IJB_1J_f}{ar\cos(\phi)(J_f(1+\varepsilon_1) - J)} \tag{25}$$

where $J_f$ is the angular momentum at orbit injection, $B_1$ is a constant gain or can be a function of J, $\epsilon_1$ is a constant, and $\phi$ is the argument of latitude given by $$\phi = \cos^{-1}\left(\frac{j(1)R(2) - j(2)R(1)}{r\sqrt{j(1)^2 + j(2)^2}}\right) \tag{26}$$

The constant $\epsilon_1$ is positive and ensures that the denominator of equation (25) does not become zero.

Another algorithm that can be used to correct for inclination dispersions involves the difference in pre-flight trajectory angular momentum and vehicle trajectory angular momentum. If this difference is driven to zero, the inclination differences will also be zero. Let $\delta J$ be the difference in pre-flight trajectory angular momentum, $J_p$, and vehicle trajectory angular momentum, $J_V$.

$$\delta\vec{J} = \vec{J}_p - \vec{J}_V \tag{27}$$

The change in angular momentum due to a yaw angle is in the direction of J×R, which is given by $$\vec{J}_Y = \vec{J} \times \vec{R}$$

$$J_Y(1) = J(2)*R(3) - J(3)*R(2)$$

$$J_Y(2) = J(3)*R(1) - J(1)*R(3)$$

$$J_Y(3) = J(1)*R(2) - J(2)*R(1) \tag{28}$$

The angular momentum correction is given by the dot product of δY and JY divided by (J)(R).

$$\Delta = \frac{\delta\vec{J} \cdot \vec{J}_Y}{JR} \tag{29}$$

The yaw angle that achieves the correction presented in equation (29) is given by $$d\theta = \frac{\Delta b_1}{ra} \tag{30}$$

where $\Delta$ is the angular momentum correction, $b_1$ is a constant gain or a function of J whose value can be adjusted as needed to ensure satisfactory performance, r is a distance to the center of the Earth or a gravitational field, and a is the vehicle acceleration.

Numerical Example

The guidance concept of some embodiments may be demonstrated using a launch to low Earth orbit of 148×130 nautical miles, with a launch azimuth of 75 degrees out of Cape Canaveral. A 3-DOF simulation was used to design the ascent trajectory. As the 3-DOF simulation executed, it created E-J and I-J files whose values extended to orbit injection. A different 3-DOF simulation was used to test the guidance concept. The initial ascent through the atmosphere is open loop. The guided simulation used the same values for pitch over, etc., as the initial simulation. Once the vehicle was out of the atmosphere, the guided simulation used the values in the E-J file to determine its pitch angle using equation (18). Equations (22) and (23) were used to steer the vehicle back to the E-J curve, if dispersions arose. Inclination errors were steered out using yaw adjustments obtained from equations (25) and (26). In equations (22) and (25), values of 10, 1, 0.05, and 0.10 were used for B, $B_1$, $\epsilon$, and $\epsilon_1$, respectively. The guided simulation followed the pre-computed E-J and I-J curves as expected and injected the payload into the desired 148×130 nautical mile orbit. Thus, the concept of using the E-J curve to guide a vehicle to orbit was demonstrated.

Figure 4:
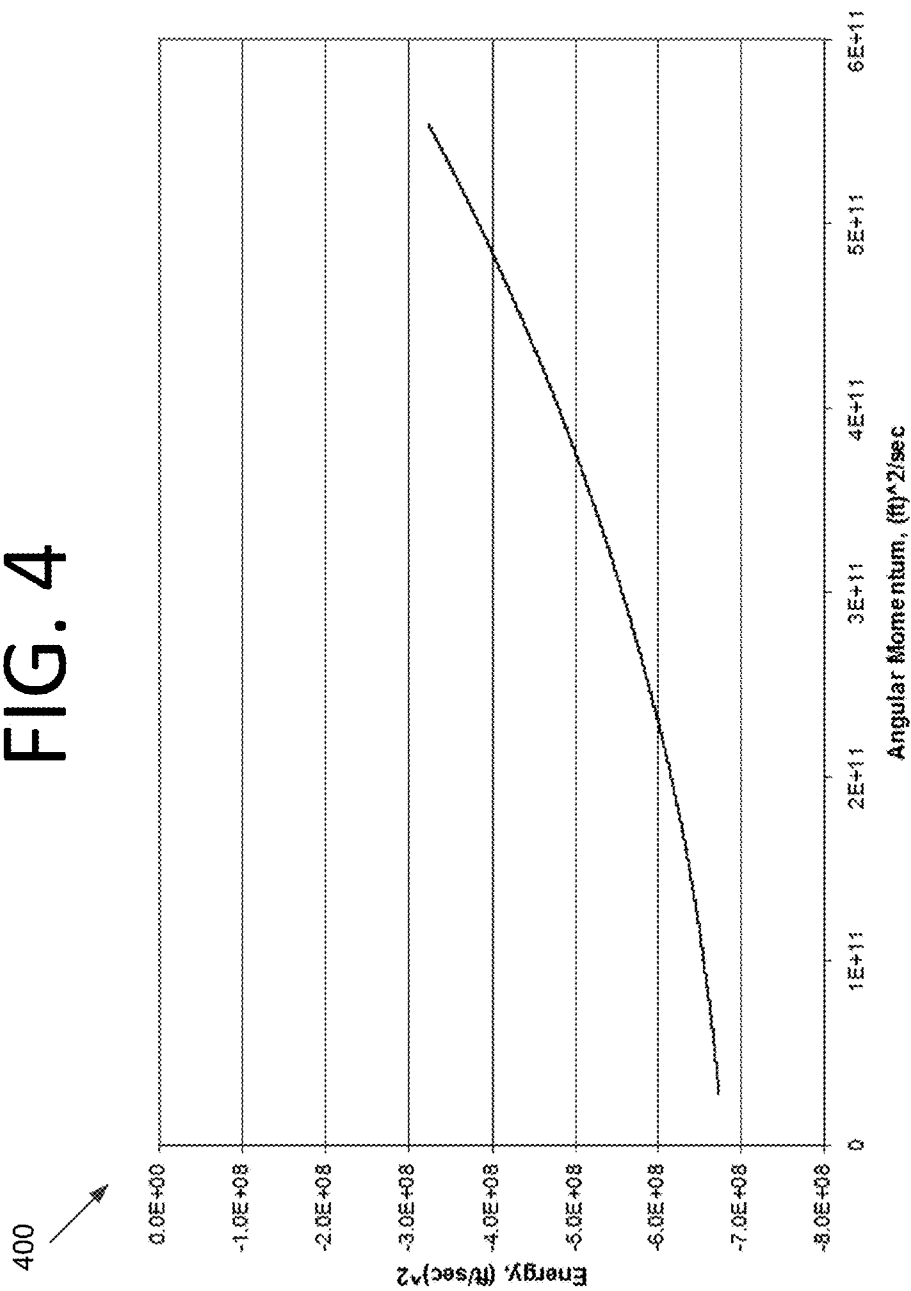
FIG. 4 is a graph illustrating an E-J curve that was used by the guided simulation to compute pitch and pitch rate, according to an embodiment of the present invention.
Figure 5:
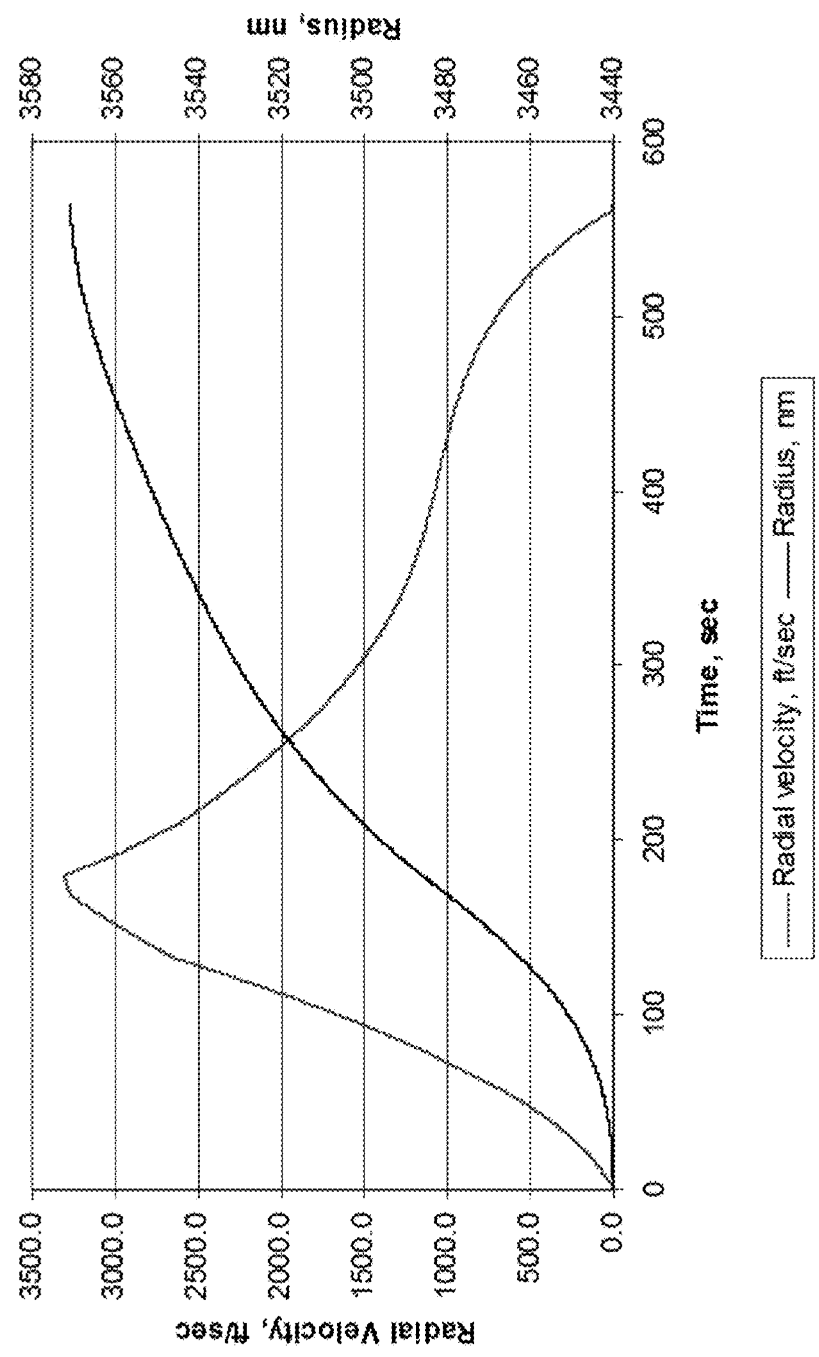
FIG. 5 is a graph illustrating the radial distance and radial velocity obtained using the guided simulation, according to an embodiment of the present invention.
Figure 6:
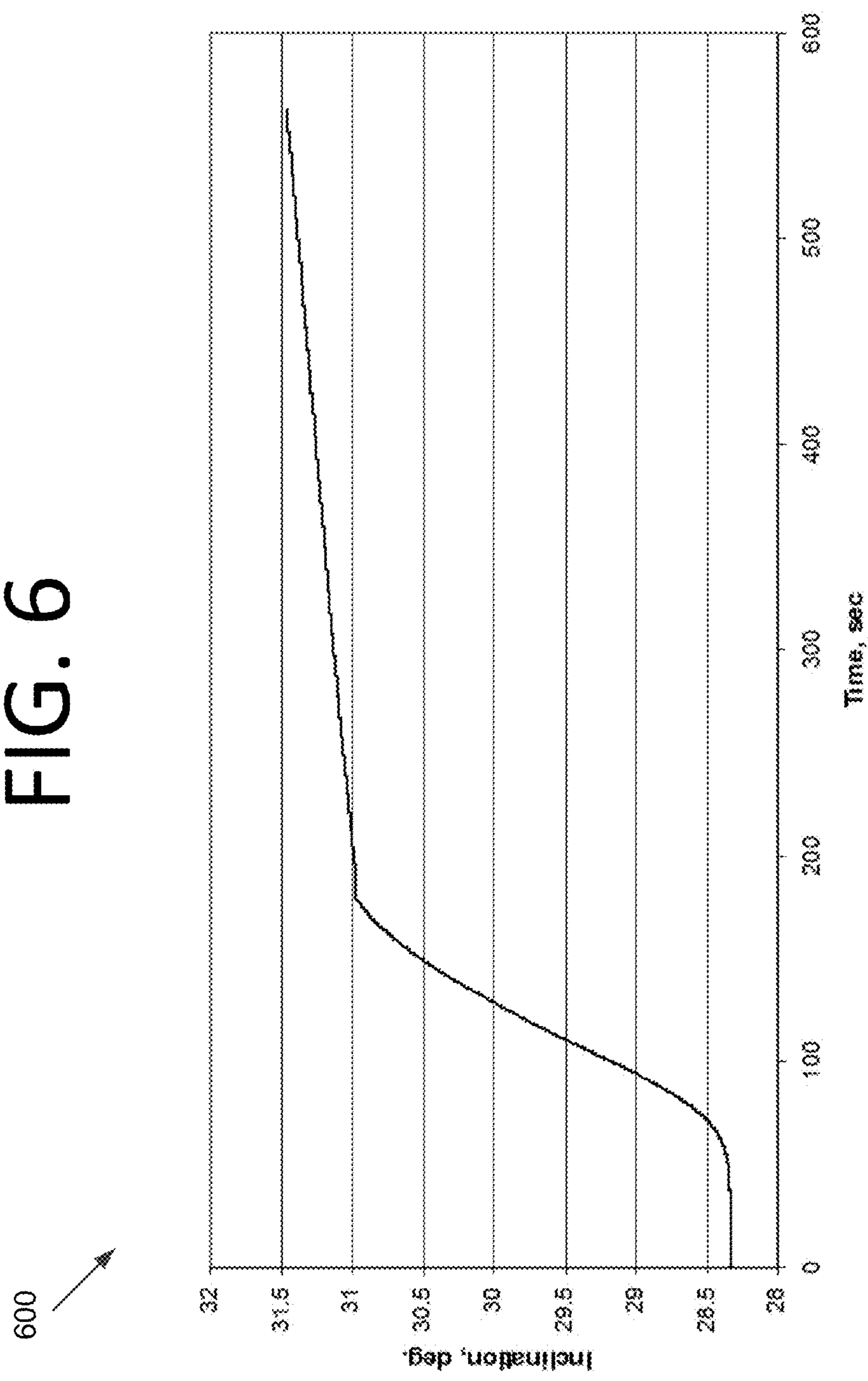
FIG. 6 is a graph illustrating the inclination angle as a function of flight time, according to an embodiment of the present invention.
Figure 7:
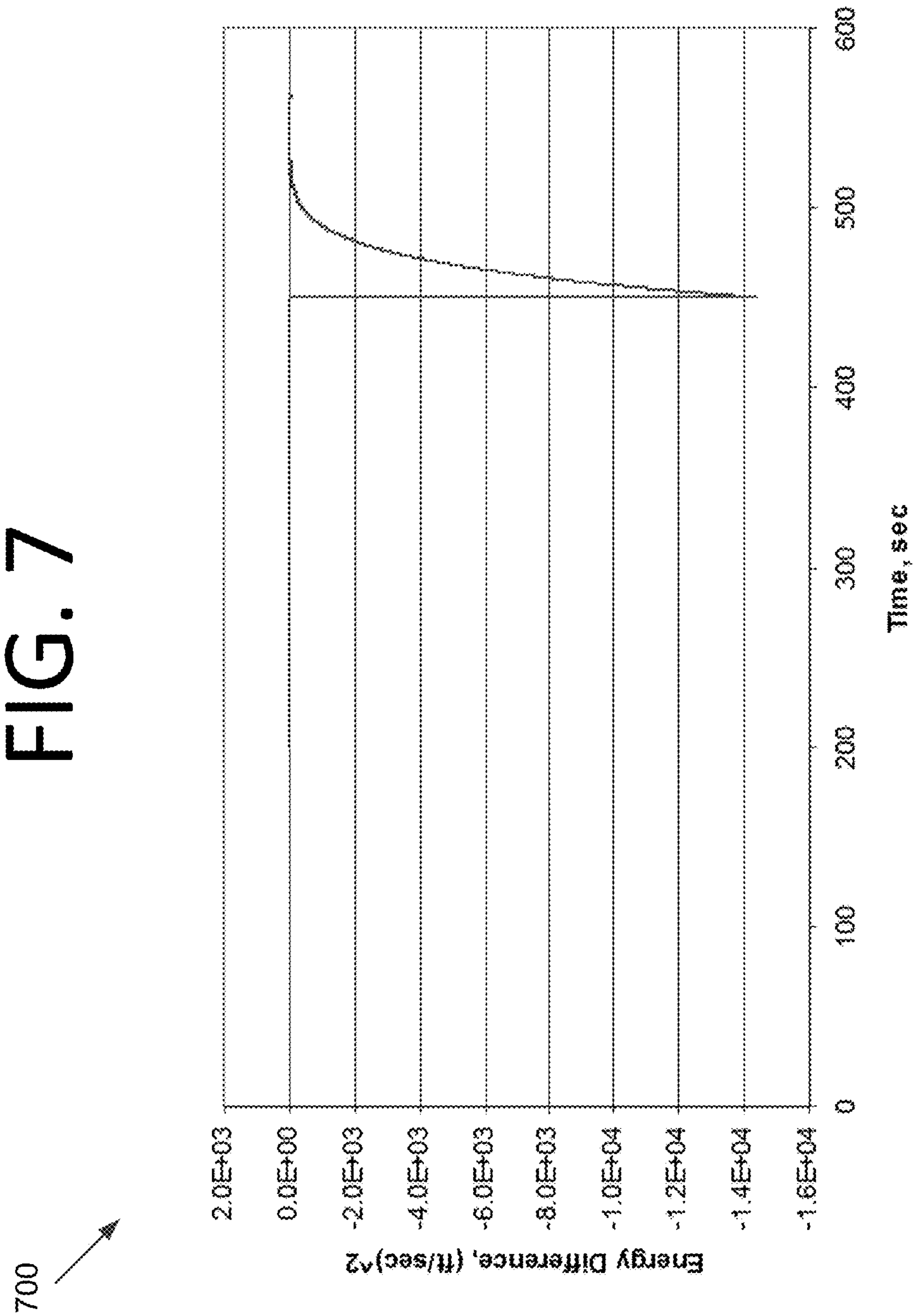
FIG. 7 is a graph illustrating the energy difference between the dispersed trajectory and the nominal trajectory for a radial shift of 900 feet at 450 seconds, according to an embodiment of the present invention.
Figure 8:
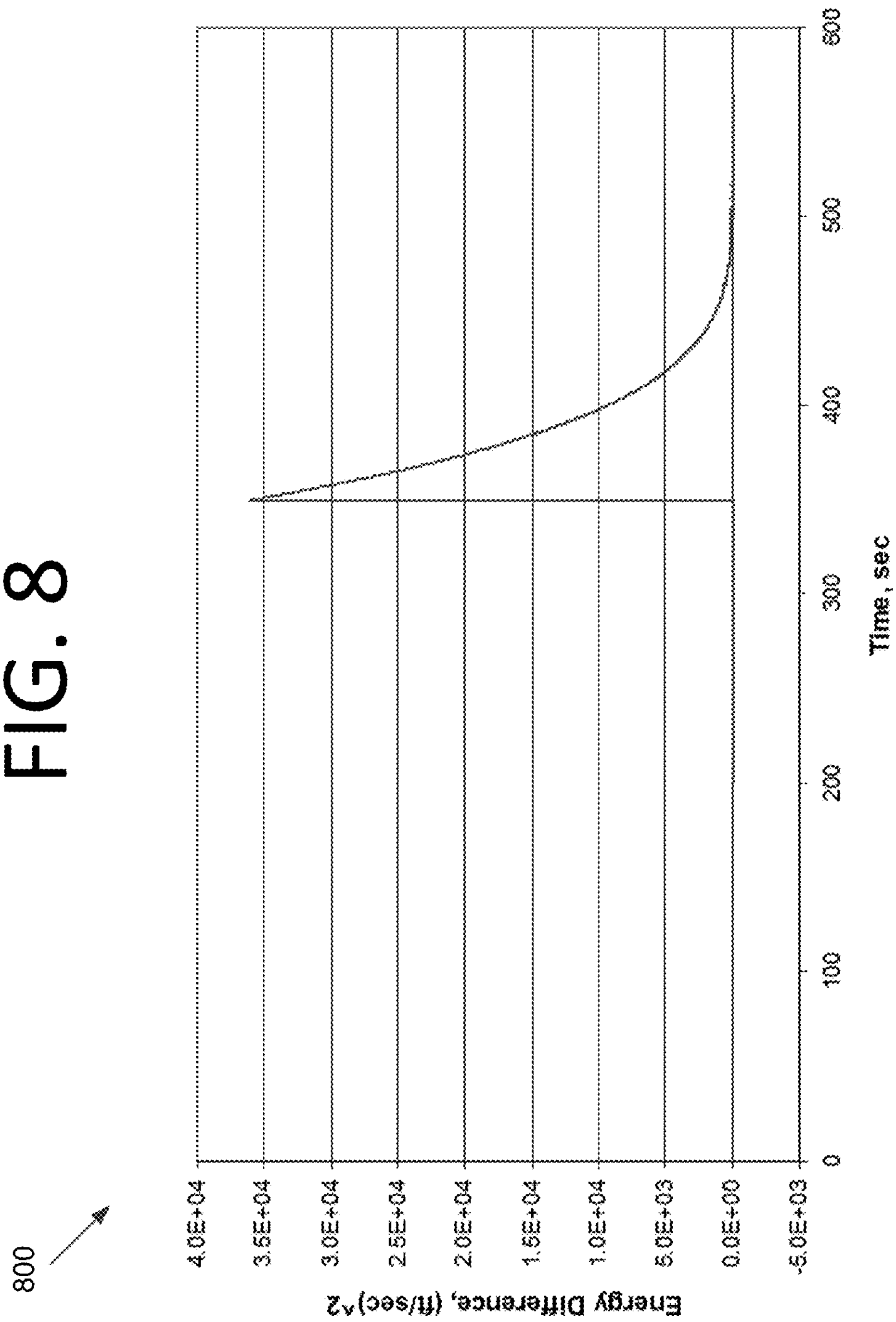
FIG. 8 is a graph illustrating the energy difference due to a decrease in tangential velocity of 50 ft/sec, according to an embodiment of the present invention.
Figure 9:
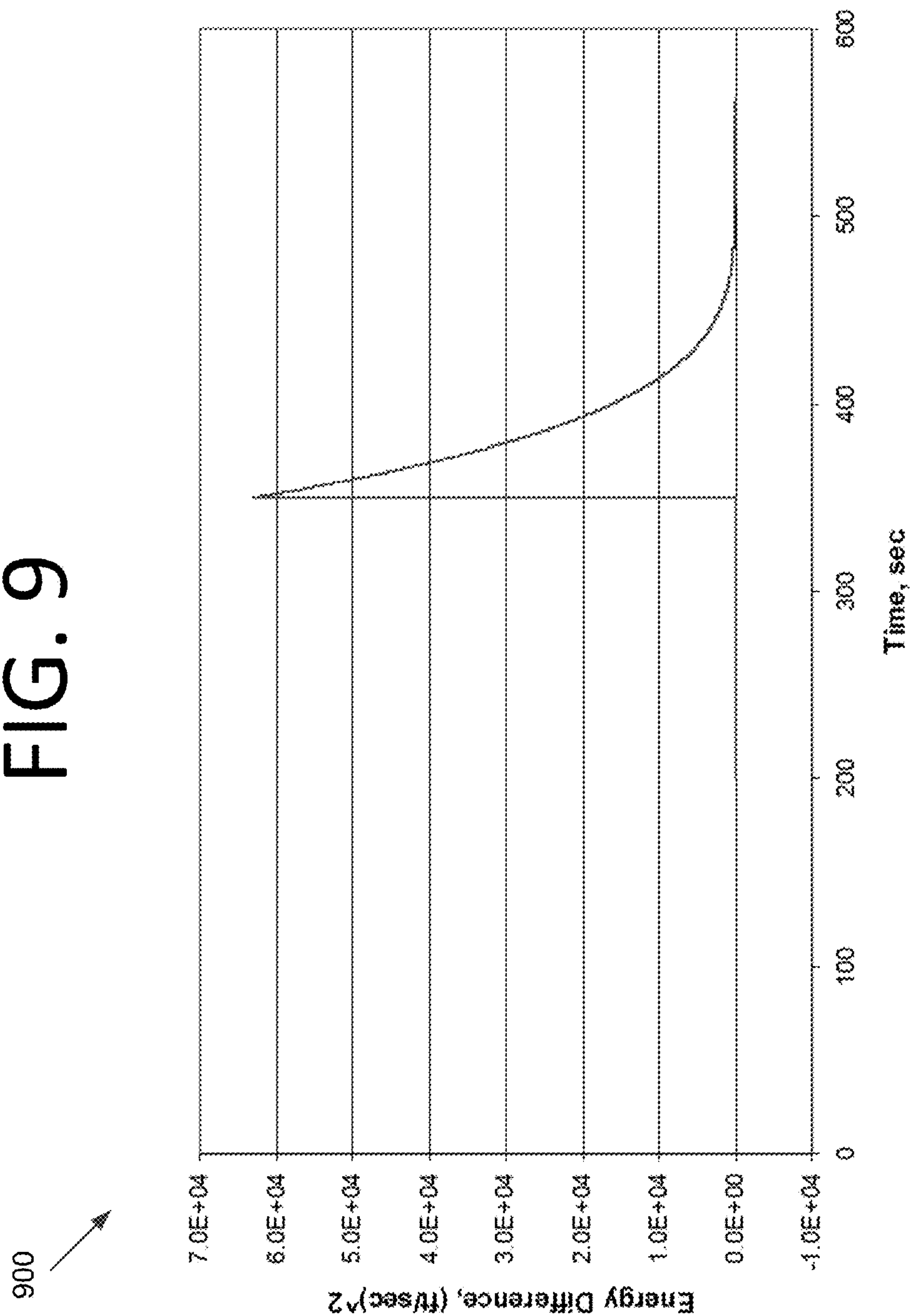
FIG. 9 is a graph illustrating the energy difference due to an increase in radial velocity of 50 ft/sec, according to an embodiment of the present invention.
Figure 10:
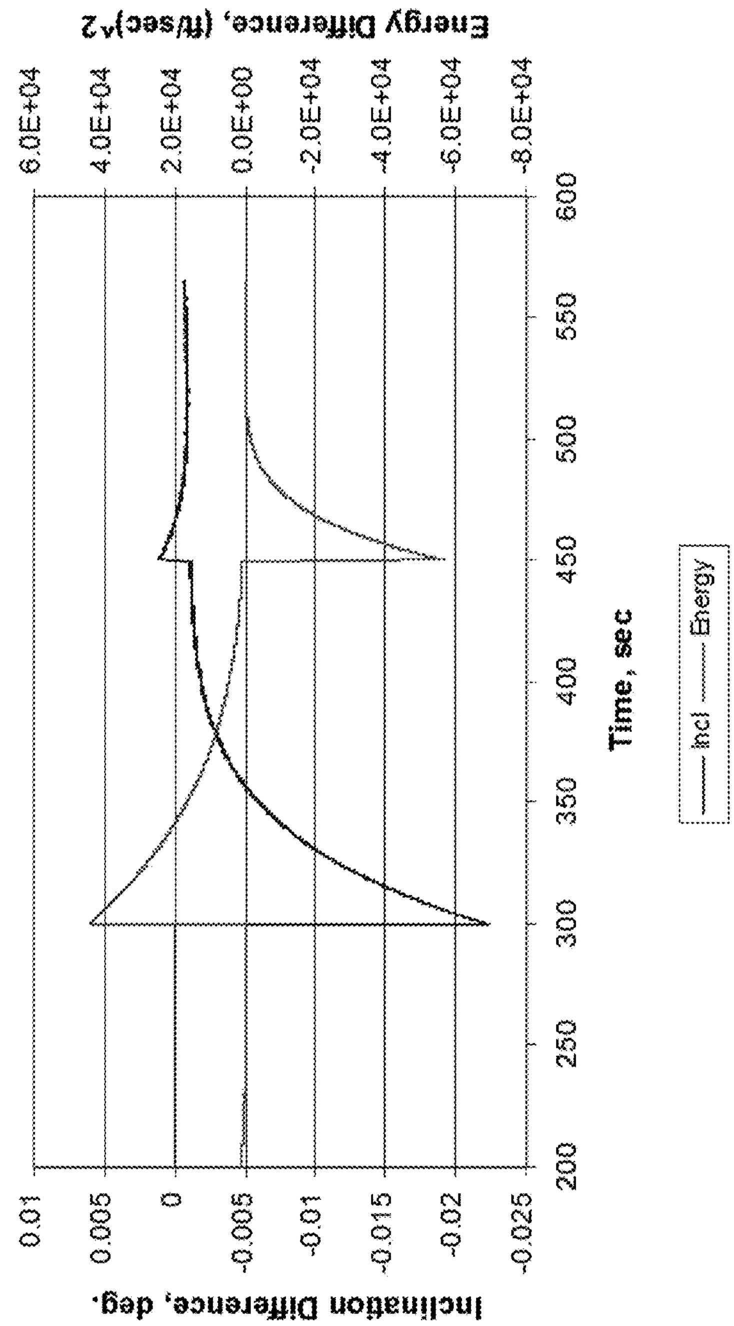
FIG. 10 is a graph illustrating guidance system corrections to displacement, velocity, and thrust errors, according to an embodiment of the present invention.

FIG. 4 is a graph 400 illustrating the E-J curve that was used by the guided simulation to compute pitch and pitch rate. FIG. 5 is a graph 500 illustrating the radial distance and radial velocity obtained using the guided simulation. FIG. 6 is a graph 600 illustrating the inclination angle as a function of flight time. FIGS. 7-9 are graphs 700, 800, 900 illustrating the guidance system performance when dispersions in radial distance, radial velocity, and tangential velocity were experienced instantaneously at particular times during ascent. For example, in FIG. 7, the radial distance was decreased by 900 ft., resulting in an instantaneous drop of the energy difference at 450 seconds. The disturbance was driven out via equations (22) and (23). In FIG. 8, the transverse velocity was decreased by 50 ft/sec instantaneously. This change reduced both energy and angular momentum. The resulting delta energy is positive as shown in FIG. 8. The guidance system corrected for the dispersion and returned the vehicle to the E-J curve. In FIG. 9, the radial velocity was increased 50 ft/sec. The guidance system handled this disturbance and again returned the vehicle to the E-J curve. FIG. 10 is a graph 1000 illustrating differences in energy and inclination as a function of time for a test case involving shifts in position, velocity, and acceleration. At 300 seconds x, y, and z inertial positions are each decreased by 9900 ft. At 450 seconds, the radial and tangential velocities are each decreased by 90 ft/sec. In addition, the thrust is decreased to 90% of its nominal value during the period from 475 to 500 seconds. Both energy and inclination errors are driven back to nearly zero as shown in FIG. 10. The correct orbit of 148×130 nautical miles was achieved for all of the cases illustrated in FIGS. 7-10. This was expected, since the vehicle followed the E-J and I-J curves once each disturbance was properly driven out. As a final test of the guidance algorithm, a thrust reduction to 80% from 375-400 seconds was applied to the guided simulation. The guidance system simply flew the vehicle for a longer time (566.3 seconds rather than the nominal 564.5 seconds) to make up for the energy loss due to the period of low thrust. The target orbit was achieved.

Figure 11:
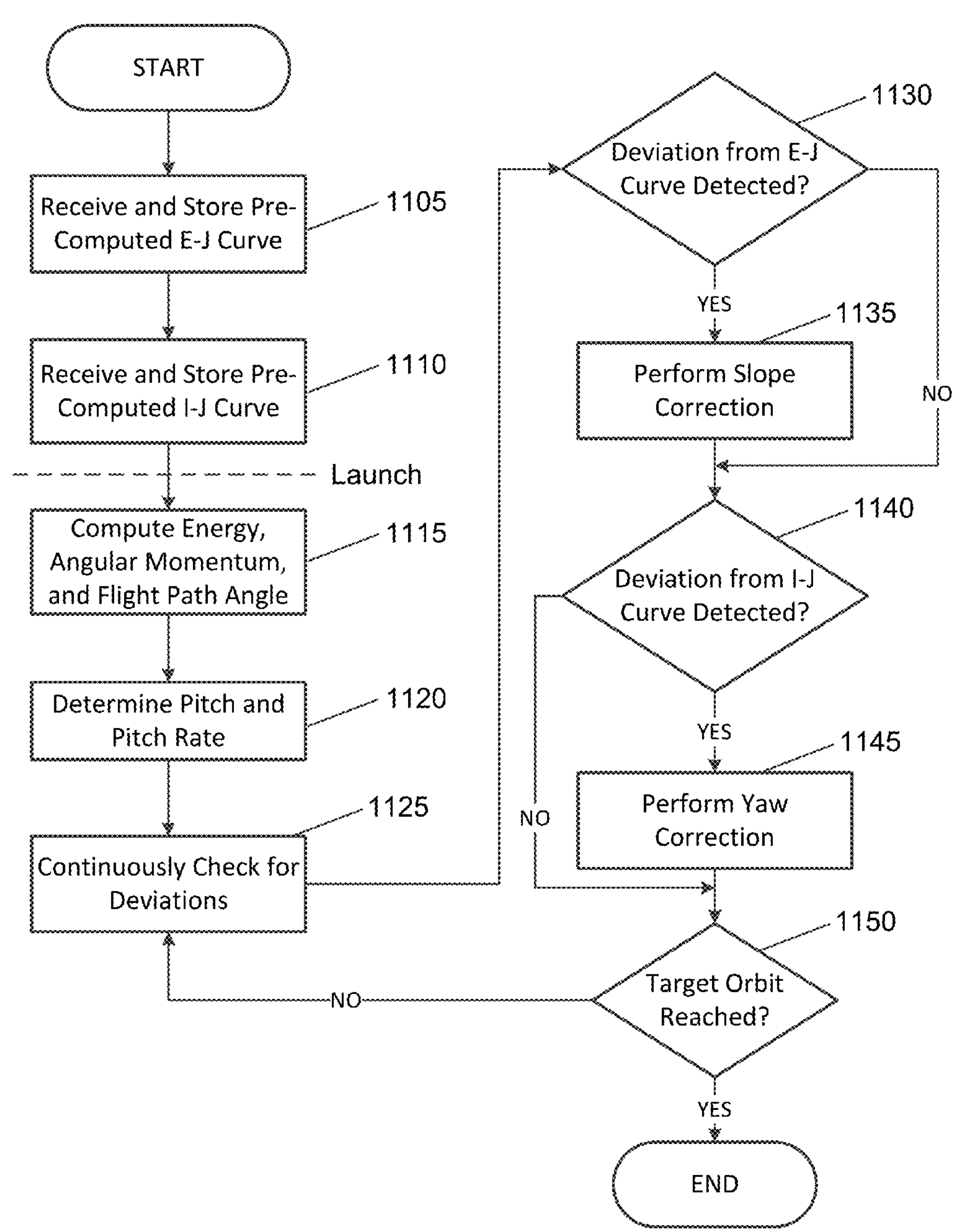
FIG. 11 is a flowchart illustrating a method for guidance of a vehicle, according to an embodiment of the present invention.

FIG. 11 is a flowchart 1100 illustrating a method for guidance of a vehicle, according to an embodiment of the present invention. In some embodiments, the method may be performed by computing system 1200 of FIG. 12, for example. The method begins with receiving and storing a pre-computed energy-angular momentum (E-J) curve to place a vehicle into a target orbit at 1105. The E-J curve may represent an optimum trajectory to reach the target orbit. The optimum trajectory may be configured to deliver a largest mass to the target orbit with a smallest amount of fuel for the vehicle. A pre-computed inclination versus angular momentum (I-J) curve is received and stored at 1110. These curves may be computed prior to launch of a vehicle and may be used to help keep the vehicle on course.

After storing the pre-computed E-J and I-J curves, the vehicle launches. Energy, angular momentum, radial distance, velocity magnitude, and flight path angle of the vehicle are computed from state vector data while the vehicle is traveling to the target orbit at 1115. This information is then used in concert with the pre-computed E-J curve to determine pitch and pitch rate of the vehicle at 1120. The vehicle continuously checks for deviations from the E-J and I-J curves from launch of the vehicle until the vehicle reaches the target orbit at 1125.

If deviations from the E-J curve by the vehicle are detected at 1130, one or more motors of the vehicle are engaged to alter a pitch of the vehicle to a corrected slope to steer out energy deviations and return the vehicle to the desired E-J curve at 1135. In some embodiments, the slope corrections may be made in accordance with equation (22). If deviations by the vehicle from the I-J curve are detected at 1140, one or more motors of the vehicle are engaged to perform yaw corrections to steer out deviations from a desired inclination at 1145. In some embodiments, the yaw corrections may be made in accordance with equation (25). If the vehicle has not reached the target orbit yet at 1150, the process repeats itself, returning to step 1125, until the vehicle reaches the target orbit.

Figure 12:
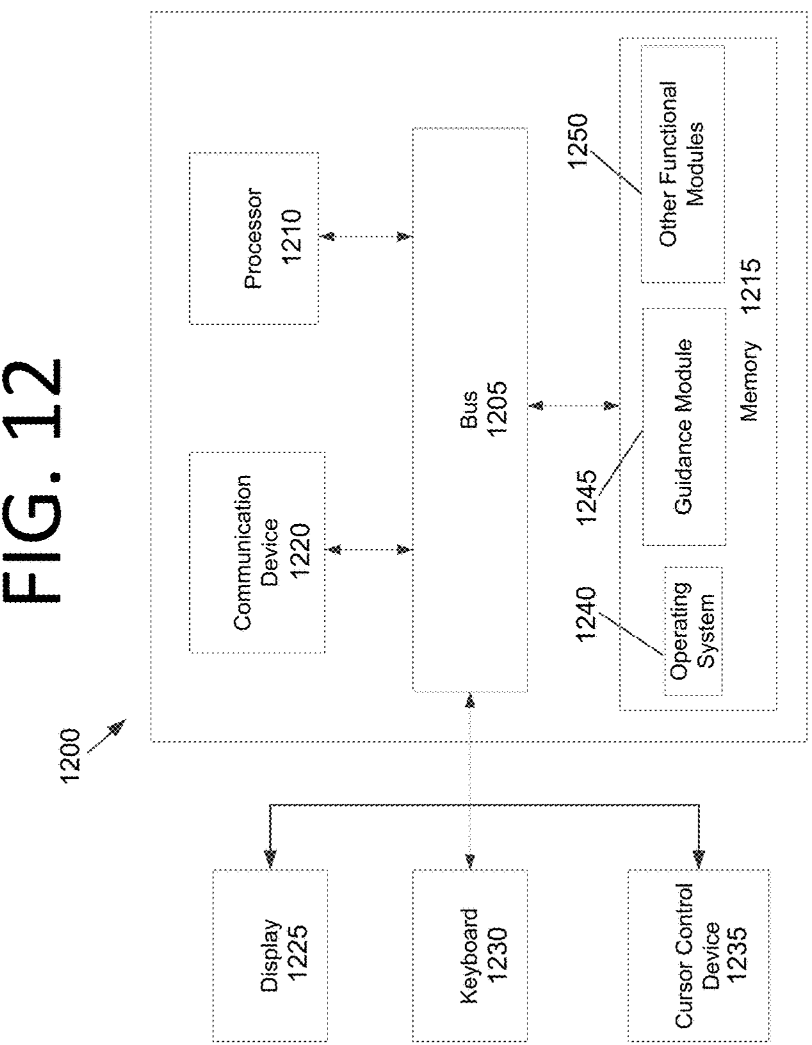
FIG. 12 illustrates a computing system for guidance of a vehicle, according to an embodiment of the present invention.

FIG. 12 illustrates a computing system for guidance of a vehicle, according to an embodiment of the present invention. System 1200 includes a bus 1205 or other communication mechanism for communicating information, and a processor 1210 coupled to bus 1205 for processing information. Processor 1210 may be any type of general or specific purpose processor, including a central processing unit ("CPU") or application specific integrated circuit ("ASIC"). System 1200 further includes a memory 1215 for storing information and instructions to be executed by processor 1210. Memory 1215 can be comprised of any combination of random access memory ("RAM"), read only memory ("ROM"), flash memory, cache, static storage such as a magnetic or optical disk, or any other types of non-transitory computer-readable media or combinations thereof. Additionally, system 1200 includes a communication device 1220, such as a transceiver, to wirelessly provide access to a telecommunications network.

Non-transitory computer-readable media may be any available media that can be accessed by processor 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor 1210 is further coupled via bus 1205 to a display 1225, such as a Liquid Crystal Display ("LCD"), for displaying information to a user. A keyboard 1230 and a cursor control device 1235, such as a computer mouse, are further coupled to bus 1205 to enable a user to interface with system 1200. However, in certain embodiments such as those for mobile computing implementations, a physical keyboard and mouse may not be present, and the user may interact with the device solely through display 1225 and/or a touchpad (not shown). Any type and combination of input devices may be used as a matter of design choice. Given that the hardware components are on a vehicle, the interface devices may not exist in some embodiments, or may be located remotely to the vehicle, such as on Earth.

In one embodiment, memory 1215 stores software modules that provide functionality when executed by processor 1210. The modules include an operating system 1240 for system 1200. The modules further include a guidance module 1245 that is configured to guide the vehicle using the methods described therein and variants thereof. System 1200 may include one or more additional functional modules 1250 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. However, in many embodiments, system 1200 will be implemented as electronics and software of a vehicle control system. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIG. 11 may be performed by a computer program, encoding instructions for the nonlinear adaptive processor to perform at least the method described in FIG. 11, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIG. 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a computer-readable storage medium, the computer program configured to cause at least one processor to:

receive and store a pre-computed energy-angular momentum (E-J) curve to place a launch vehicle into a target orbit;

compute an energy, angular momentum, radial distance, velocity magnitude, and flight path angle of the launch vehicle from state vector data while the launch vehicle is traveling to the target orbit; and use the pre-computed E-J curve and the computed energy, angular momentum, radial distance, velocity magnitude, and flight path angle of the launch vehicle to determine pitch and pitch rate of the launch vehicle.

2. The computer program of claim 1, wherein when the launch vehicle deviates from the E-J curve, the program is further configured to cause the at least one processor to engage one or more motors of the launch vehicle to alter a pitch of the launch vehicle to a corrected slope to steer out energy deviations and return the launch vehicle to the E-J curve.

3. The computer program of claim 2, wherein the program is configured to cause the at least one processor to determine the corrected slope by $$\delta(J) = \frac{(B)\Delta E}{(1+\varepsilon)J_f - J}$$

where B is a constant gain or a function of J whose value can be adjusted as needed to ensure satisfactory performance, ΔE is a difference between actual vehicle energy and energy prescribed by the E-J curve, $J_f$ refers to final angular momentum at orbit injection, and constant $\epsilon$ is a small positive non-dimensional number that ensures that a denominator of the equation does not become zero.

4. The computer program of claim 1, wherein the program is further configured to cause the at least one processor to receive and store a pre-computed inclination versus angular momentum (I-J) curve.

5. The computer program of claim 4, wherein when the launch vehicle deviates from the I-J curve, the program is further configured to cause the at least one processor to engage one or more motors of the launch vehicle to perform yaw corrections to steer out deviations from a desired inclination.

6. The computer program of claim 5, wherein the program is configured to cause the at least one processor to determine the yaw corrections by $$\delta\theta = \frac{-\Delta IJB_1J_f}{arcos(\phi)(J_f(1+\varepsilon_1) - J)}$$

where ΔI is a change in inclination, J is angular momentum, $J_f$ is angular momentum at orbit injection, $B_1$ is a constant gain or a function of J, $\epsilon_1$ is a constant, r is a distance to a center of Earth or gravitational field, a is an acceleration, and $\phi$ is an argument of latitude.

7. The computer program of claim 1, wherein the E-J curve represents an optimum trajectory to reach the target orbit.

8. The computer program of claim 7, wherein the optimum trajectory is configured to deliver a largest mass to the target orbit with a smallest amount of fuel for the launch vehicle.

9. The computer program of claim 1, wherein the program is further configured to cause the at least one processor to continuously check for deviations by the launch vehicle from the E-J and I-J curves from launch of the launch vehicle until the launch vehicle reaches the target orbit.

10. The computer program of claim 1, wherein the program is further configured to cause the at least one processor to calculate inclination dispersions by taking a difference between pre-flight trajectory angular momentum and vehicle trajectory angular momentum and drive the difference to zero.

11. A computer-implemented method, comprising:

receiving and storing a pre-computed energy-angular momentum (E-J) curve to place a launch vehicle into a target orbit;

computing an energy, angular momentum, radial distance, velocity magnitude, and flight path angle of the launch vehicle from state vector data while the launch vehicle is traveling to the target orbit; and using the pre-computed E-J curve and the computed energy, angular momentum, radial distance, velocity magnitude, and flight path angle of the launch vehicle to determine pitch and pitch rate of the launch vehicle.

12. The computer-implemented method of claim 11, wherein when the launch vehicle deviates from the E-J curve, the method further comprises engaging one or more motors of the launch vehicle to alter a pitch of the launch vehicle to a corrected slope to steer out energy deviations and return the launch vehicle to the desired E-J curve.

13. The computer-implemented method of claim 12, the corrected slope is determined by $$\delta(J) = \frac{(B)\Delta E}{(1+\varepsilon)J_f - J}$$

where B is a constant gain or a function of J whose value can be adjusted as needed to ensure satisfactory performance, ΔE is a difference between actual vehicle energy and energy prescribed by the E-J curve, $J_f$ refers to final angular momentum at orbit injection, and constant $\epsilon$ is a small positive non-dimensional number that ensures that a denominator of the equation does not become zero.

14. The computer-implemented method of claim 11, further comprising:

receiving and storing a pre-computed inclination versus angular momentum (I-J) curve.

15. The computer-implemented method of claim 14, wherein when the launch vehicle deviates from the I-J curve, the method further comprises engaging one or more motors of the launch vehicle to perform yaw corrections to steer out deviations from a desired inclination.

16. The computer program of claim 15, wherein the yaw corrections are determined by $$\delta\theta = \frac{-\Delta IJB_1 J_f}{arcos(\phi)(J_f(1+\varepsilon_1) - J)}$$

where ΔI is a change in inclination, J is angular momentum, $J_f$ is angular momentum at orbit injection, $B_1$ is a constant gain or a function of J, $\epsilon_1$ is a constant, r is a distance to a center of Earth or gravitational field, a is an acceleration, and $\phi$ is an argument of latitude.

17. The computer-implemented method of claim 11, wherein the E-J curve represents an optimum trajectory to reach the target orbit.

18. The computer-implemented method of claim 17, wherein the optimum trajectory is configured to deliver a largest mass to the target orbit with a smallest amount of fuel for the launch vehicle.

19. The computer-implemented method of claim 11, further comprising:

continuously checking for deviations by the launch vehicle from the E-J and I-J curves from launch of the launch vehicle until the launch vehicle reaches the target orbit.

20. The computer-implemented method of claim 11, further comprising:

calculating inclination dispersions by taking a difference between pre-flight trajectory angular momentum and vehicle trajectory angular momentum; and driving the difference to zero.

21. An apparatus, comprising:

physical memory comprising computer program instructions; and at least one processor configured to execute the computer program instructions, the at least one processor configured to:

receive and store a pre-computed energy-angular momentum (E-J) curve to place a launch vehicle into a target orbit;

compute an energy, angular momentum, radial distance, velocity magnitude, and flight path angle of the launch vehicle from state vector data while the launch vehicle is traveling to the target orbit; and use the pre-computed E-J curve and the computed energy, angular momentum, radial distance, velocity magnitude, and flight path angle of the launch vehicle to determine pitch and pitch rate of the launch vehicle.

22. The apparatus of claim 21, wherein when the launch vehicle deviates from the E-J curve, the at least one processor is further configured to engage one or more motors of the launch vehicle to alter a pitch of the launch vehicle to a corrected slope to steer out energy deviations and return the launch vehicle to the E-J curve.

23. The apparatus of claim 22, wherein the at least one processor is configured to determine the corrected slope by $$\delta(J) = \frac{(B)\Delta E}{(1+\varepsilon)J_f - J}$$

where B is a constant gain or a function of J whose value can be adjusted as needed to ensure satisfactory performance, ΔE is a difference between actual vehicle energy and energy prescribed by the E-J curve, $J_f$ refers to final angular momentum at orbit injection, and constant $\epsilon$ is a small positive non-dimensional number that ensures that a denominator of the equation does not become zero.

24. The apparatus of claim 21, wherein the at least one processor is further configured to receive and store a pre-computed inclination versus angular momentum (I-J) curve.

25. The apparatus of claim 24, wherein when the launch vehicle deviates from the I-J curve, the at least one processor is further configured to engage one or more motors of the launch vehicle to perform yaw corrections to steer out deviations from a desired inclination.

26. The apparatus of claim 25, wherein the at least one processor is configured to determine the yaw corrections by $$\delta\theta = \frac{-\Delta IJB_1 J_f}{arcos(\phi)(J_f(1+\varepsilon_1) - J)}$$

where ΔI is a change in inclination, J is angular momentum, $J_f$ is angular momentum at orbit injection, $B_1$ is a constant gain or a function of J, $\epsilon_1$ is a constant, r is a distance to a center of Earth or gravitational field, a is an acceleration, and $\phi$ is an argument of latitude.

27. The apparatus of claim 21, wherein the E-J curve represents an optimum trajectory to reach the target orbit.

28. The apparatus of claim 27, wherein the optimum trajectory is configured to deliver a largest mass to the target orbit with a smallest amount of fuel for the launch vehicle.

29. The apparatus of claim 21, wherein the at least one processor is further configured to continuously check for deviations by the launch vehicle from the E-J and I-J curves from launch of the launch vehicle until the launch vehicle reaches the target orbit.

30. The apparatus of claim 21, wherein the at least one processor is further configured to calculate inclination dispersions by taking a difference between pre-flight trajectory angular momentum and vehicle trajectory angular momentum and drive the difference to zero.

* * * * *